United States Patent
Chen et al.

(10) Patent No.: US 7,632,018 B2
(45) Date of Patent: Dec. 15, 2009

(54) SYNCHRONOUS CHAIN FOR A LINEAR GUIDEWAY

(75) Inventors: Hsin-Liang Chen, Taichung (TW); Hsin-Tsun Hsu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 407 days.

(21) Appl. No.: 11/684,003

(22) Filed: Mar. 8, 2007

(65) Prior Publication Data

US 2008/0219604 A1 Sep. 11, 2008

(51) Int. Cl.
*F16C 29/06* (2006.01)

(52) U.S. Cl. .............................. 384/51; 384/43; 384/45

(58) Field of Classification Search ............. 384/43–45, 384/51–53; 474/154, 203, 253–259; 59/78–79
See application file for complete search history.

(56) References Cited

U.S. PATENT DOCUMENTS

| | | | | |
|---|---|---|---|---|
| 1,327,925 A | * | 1/1920 | Schneider | 474/203 |
| 3,494,214 A | * | 2/1970 | Egli | 474/203 |
| 3,517,565 A | * | 6/1970 | Smith | 474/203 |
| 4,214,488 A | * | 7/1980 | Conrad | 474/154 |
| 5,392,616 A | * | 2/1995 | Ballenegger | 63/3.1 |
| 5,411,445 A | * | 5/1995 | Oda | 474/203 |
| 6,364,086 B1 | * | 4/2002 | Blaurock et al. | 193/35 MD |
| D516,767 S | * | 3/2006 | Layne | D34/29 |
| 7,178,982 B2 | * | 2/2007 | Chin-Pei et al. | 384/51 |
| 7,320,547 B2 | * | 1/2008 | Kuo et al. | 384/45 |
| 2005/0036721 A1 | * | 2/2005 | Wu et al. | 384/51 |
| 2007/0160313 A1 | * | 7/2007 | Kuo et al. | 384/51 |

FOREIGN PATENT DOCUMENTS

JP 05295642 A * 11/1993
JP 11294452 A * 10/1999

* cited by examiner

*Primary Examiner*—Marcus Charles
(74) *Attorney, Agent, or Firm*—Banger Shia (57) ABSTRACT

A synchronous chain for a liner guideway moved in the guideway by cooperating with rolling elements, which is characterized in that: both ends of the chain are connected to a head portion and a tail portion respectively, furthermore, the head portion and the tail portion are interconnected in a staggered manner, a moving space is predetermined in the radial part of head portion and the tail portion, in addition, a shape formed by the interconnection of the head portion and the tail portion is a sphere. In such way, the synchronous chain not only can avoid the interference during circulation, also the sphere formed by the interconnection of the head portion and the tail portion has the guiding effect, and can absorb the size variation by cooperating with the radial degree of freedom, furthermore, it is convenient for mass production and assembly.

9 Claims, 15 Drawing Sheets

SYNCHRONOUS CHAIN FOR A LINEAR GUIDEWAY

BACKGROUND OF THE INVENTION

1. Field of the Invention

The present invention relates to relevant fittings for a liner guideway and more particularly to a synchronous chain for a liner guideway whose head portion and tail portion are interconnected to avoid the interference, create guiding effect, effectively absorb size variation and have the practicality of mass production and assembly.

2. Description of the Prior Art

Nowadays, linear guideways are applied in the industry more and more, besides the high precision effect for the linear feed transmission, it further has the advantages of low frictional loss ratio, high energy-conversion ratio, low noise, and high stiffness not easy to damage etc. Hence, it is self-evident that the linear guideway is very important to the recent various industrial mechanisms.

In order to enable the rollers between the rail and the slide block to circulate endlessly and eliminate the stress therein, the recent linear guideway is provided with a chain retaining a plurality of rolling elements, and the rolling elements and the chain are made to perform a synchronous circulating motion between the slide block and the rail. However, different designs all have their respective shortcomings, accordingly, the recent industry emphasis is focused on how to research and develop the more competitive products from the lubricant units.

Figure 1:
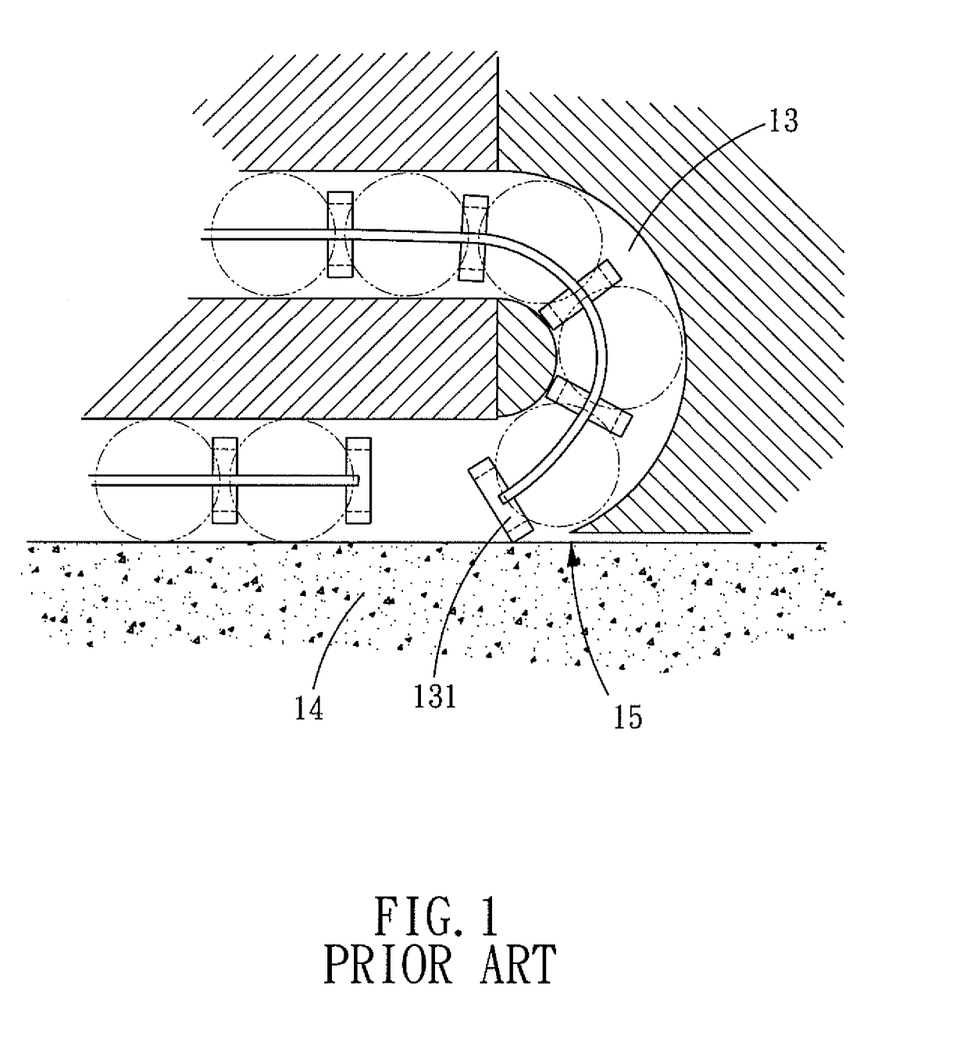
FIG. 1 shows an end-type conventional chain.

Frequently used conventional chains are shown in FIGS. 1-4; please refer to the following descriptions:

FIG. 1 shows an end-type conventional chain, both end portions 131 of the chain 13 are not connected, in such a manner, not only the end portions 131 are likely to protrude, but also a clearance exists between the two end portions 131, thereby, both end portions 131 of the chain 13 are likely to sway during the operation process, especially when passing the return path, both end portions of the synchronous chain 13 will sway violently, thus impacting the rail surface 14, or even the end portions of the synchronous chain 13 will be hooked by the patch 15 of the end cap. Consequently, the chain 13 can't move smoothly during operation process.

Figure 2:
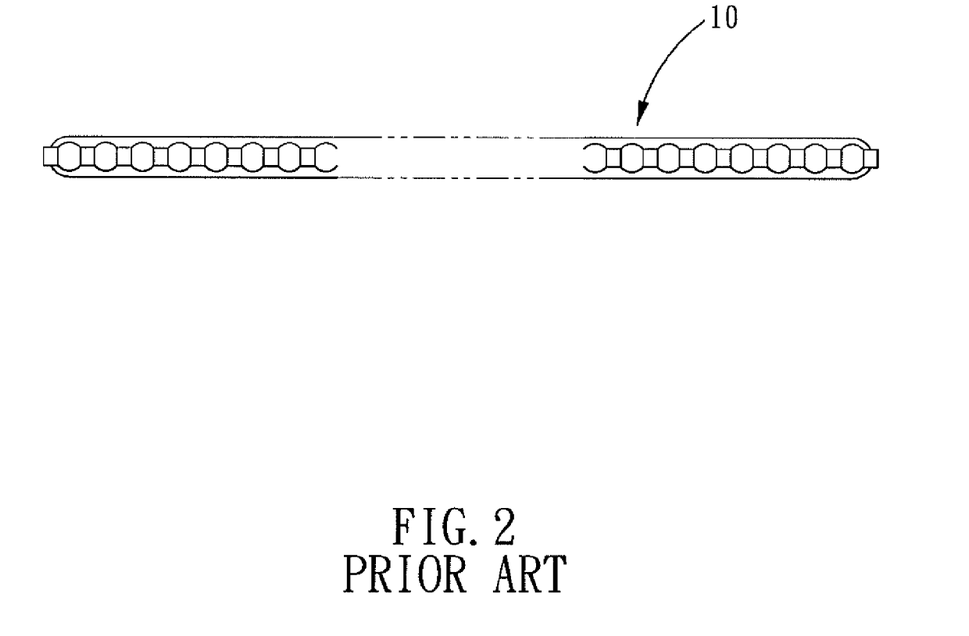
FIG. 2 shows a conventional chain disclosed by JP Pat. No. 3,243,415.

FIG. 2 shows a conventional chain 10 disclosed by JP Pat. No. 3,243,415, the conventional chain 10 is still provided with protruded end portions. Although both end portions of the chain 10 are formed respectively with two arc-surfaces, between the two end portions of the chain 10 is still defined a swaying clearance. The problem of the conventional chain 10 exists on the two end portions thereof. Since both end portions of the chain 10 are free, both end portions will random sway during the circulating motion, causing the interference to the rail of the rolling elements or to the patch portion.

Figure 3:
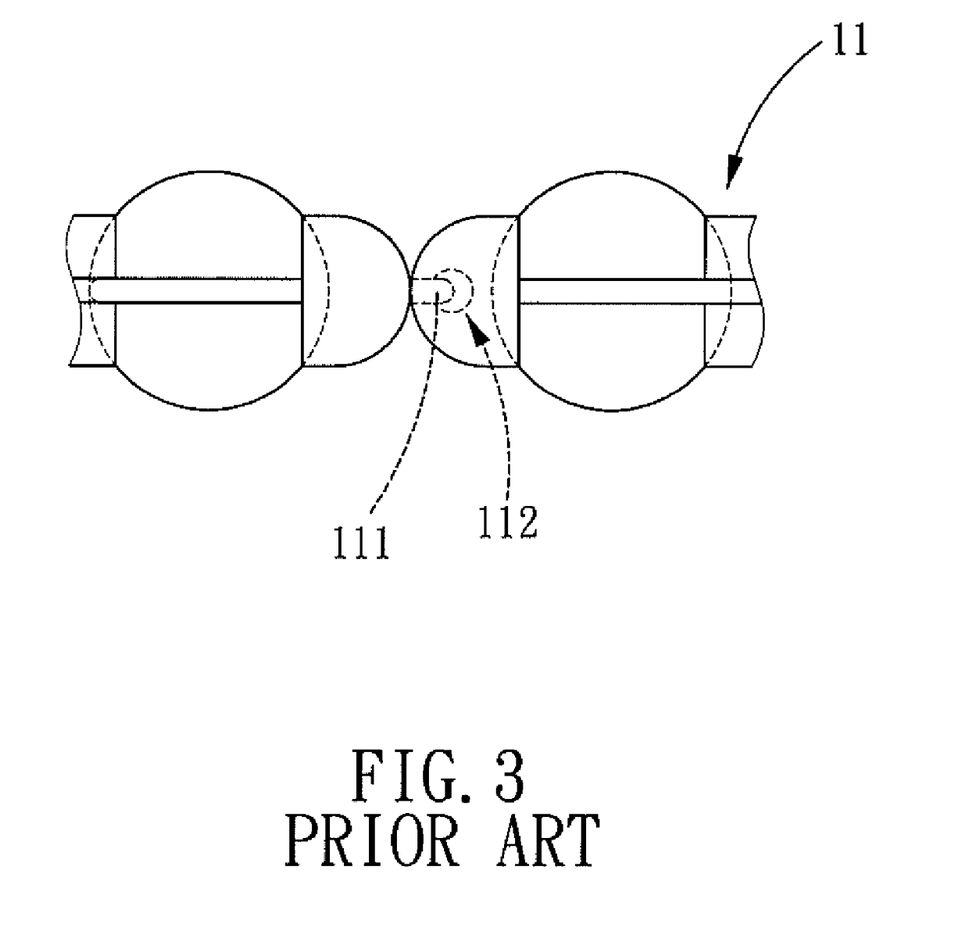
FIG. 3 is a perspective view of a conventional chain disclosed by JP Pat. No. H11-294452.

FIG. 3 shows a chain 11 without end disclosed by JP Pat. No. H 11-294452. Two ends of the chain 11 are connected by engaging a fastening rod 111 on one end thereof with a fastening seat 112 on the other end thereof. In such a manner, though the problem that both end portions will sway random is avoided; the obvious problem of the chain 11 is that the non-degree of freedom link manner of the two end portions thereof cannot absorb the radial size variation caused by the shortening stress and stretching stress during the operation process of the chain 11.

Figure 4:
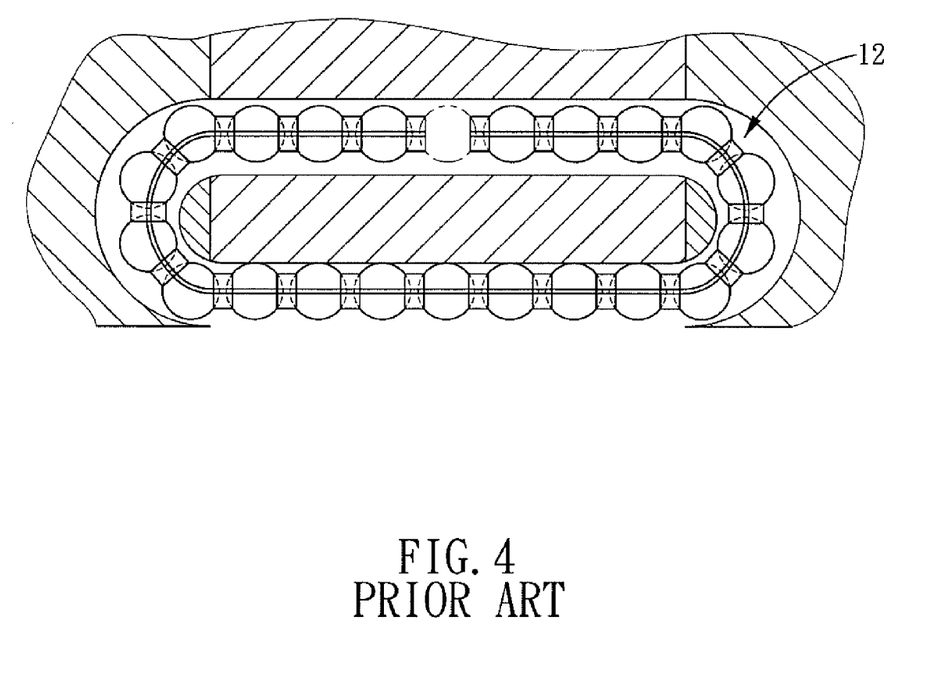
FIG. 4 is a cross sectional view of a conventional chain disclosed by JP Pat. No. 2,607,993.

FIG. 4 shows an integrally formed synchronous chain 12 without ends disclosed by JP Pat. No. 2,607,993. Though the conventional chain 12 is integrally formed to avoid the swaying problem caused by the end portions; the integral forming method is not very practical. The problem, which cannot be broke through, is that the synchronous chain 12 is difficult to design, to manufacture, to assemble and disassemble. Consequently, the technology is difficult to really apply and is quite difficult to carry out in mass production.

The aforementioned four categories of conventional technologies not only have their own inherent problems, and the chain is provided for bearing the pressure and rolling to eliminate the moving stress, thereby, the chain must reduce the most of the swaying motions of the ends during the movement, avoid the interference and absorb radial size variation, also the chain should consider the rationality of mass production, assembly and disassembly. However, various chains in the recent market still don't have the aforementioned effects.

In order to effectively solve the aforementioned problems, basing on the research and design technologies and experiences in the linear guideway field, the applicant of the present invention has eventually developed an original synchronous chain for a liner guideway from the angle of reasonable mass production and avoiding the interference.

SUMMARY OF THE INVENTION

The primary objective of the present invention is to provide a synchronous chain which can avoid the interference during circulation, and a sphere formed by the interconnection of a head portion and a tail portion has the guiding effect.

The second objective of the present invention is to provide a synchronous chain which can effectively absorb size variation by cooperating with the radial degree of freedom.

In order to achieve the aforementioned objectives, both ends of the aforementioned chain of the present invention is particularly connected with a head portion and a tail portion respectively, the key is that the head portion and the tail portion are interconnected in a staggered manner in the axial direction of the structure, and the shape formed by the interconnection of the head portion and the tail portion is a sphere the shape of which is corresponding to the shape of rolling elements. Thereby, the present invention not only can avoid the interference caused by the swaying motions of the head portion and the tail portion, also the sphere formed by the interconnection of the head portion and the tail portion has the guiding effect.

Furthermore, in order to achieve the aforementioned secondary objective, the head portion and the tail portion of the present invention are predetermined two free moving spaces in the radial direction respectively. With the free moving spaces the head portion and the tail portion can obtain a respective radial degree of freedom, so as to effectively absorb the size variation during the circulation of the chain. Hence, it is a quite practical invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 5:
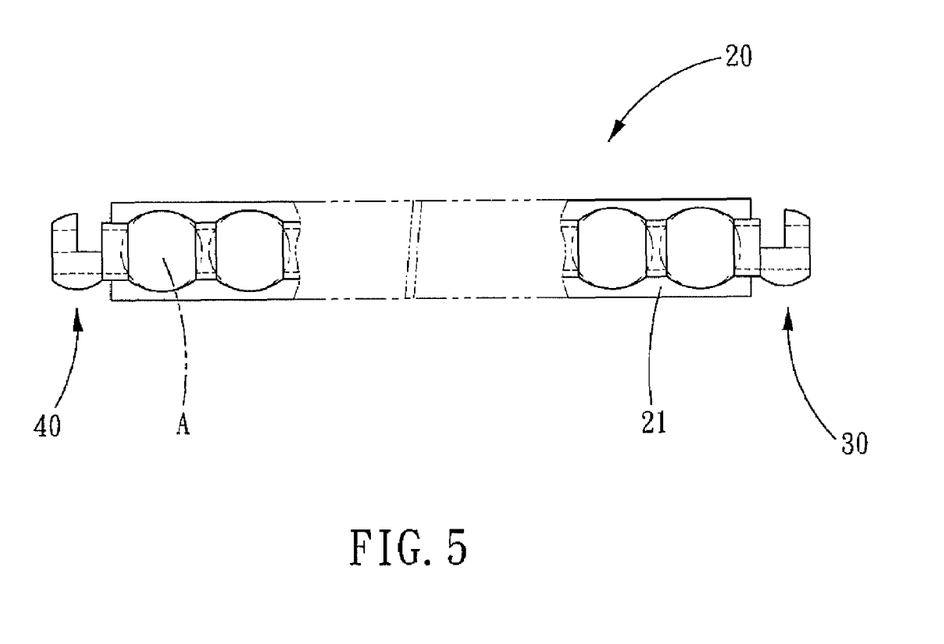
FIG. 5 shows a synchronous chain of a first embodiment in accordance with the present invention.
Figure 6:
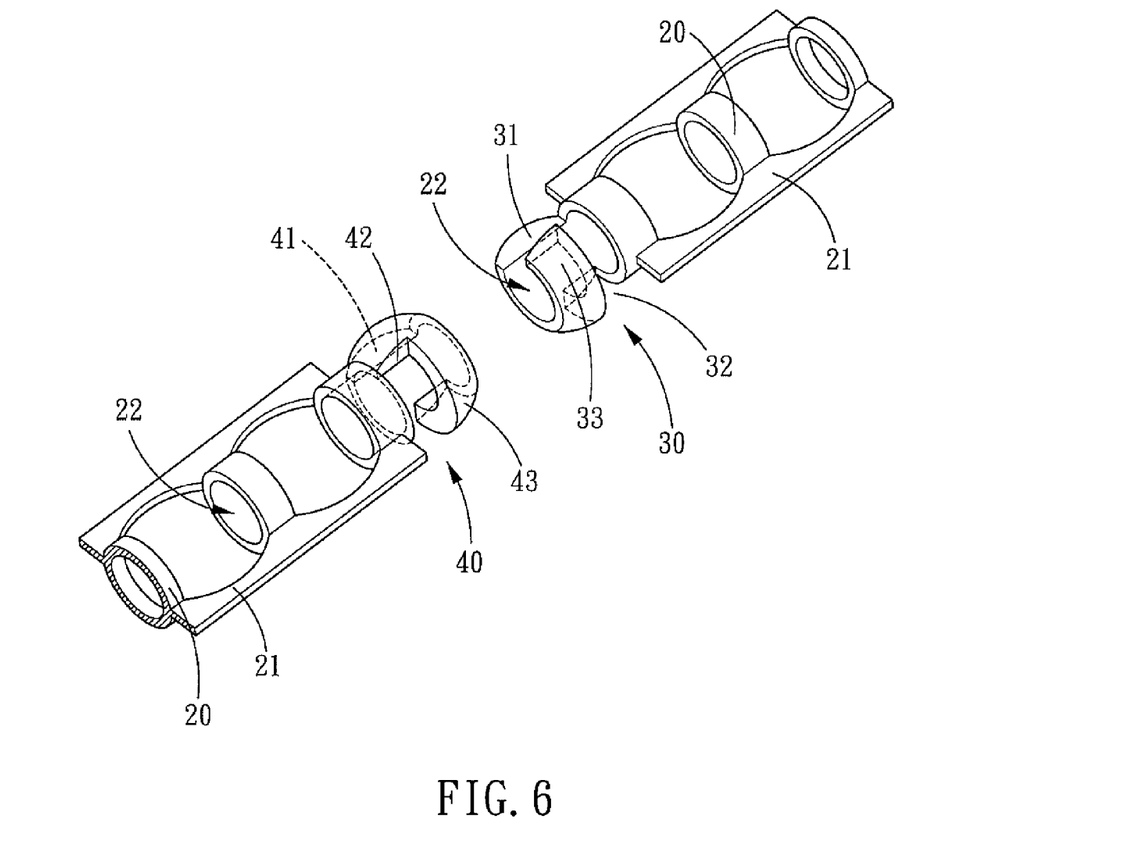
FIG. 6 is an exploded view of the synchronous chain of the first embodiment in accordance with the present invention.
Figure 7:
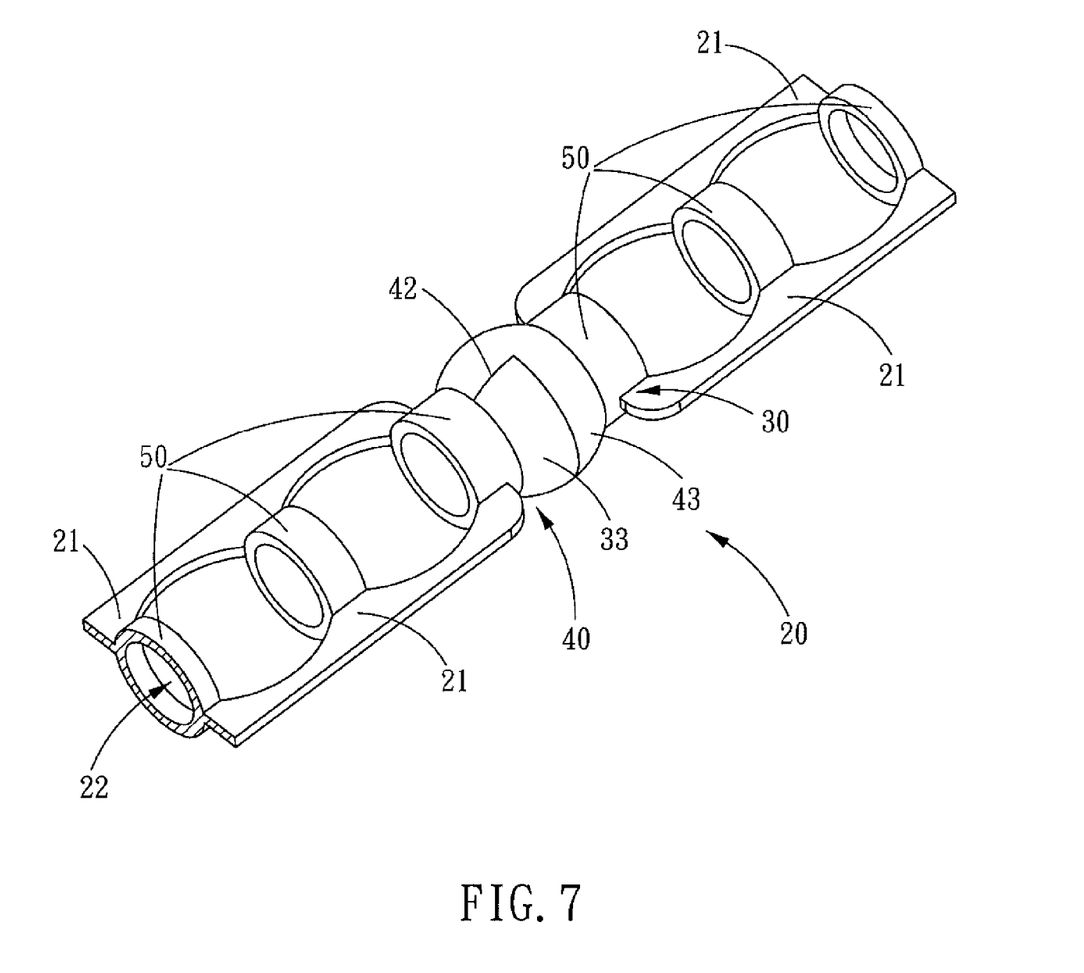
FIG. 7 is an amplified assembly view of the synchronous chain of the first embodiment in accordance with the present invention.

FIGS. 5-7 show a first embodiment in accordance with the present invention. A chain 20 of the first embodiment has a head portion 30 integrally formed with one end thereof and has a tail portion 40 integrally formed with the other end thereof. From the head portion 30 to the tail portion 40 is formed a central through hole 22 for reserving lubricant. A plurality of rolling elements A is retained in the chain 20 by spacers 50. The chain 20 comprises two conjoint protruded elongated link portions 21 which are not extended to both of the head portion 30 and tail portion 40.

The head portion 30 is connected to one end of the chain 20, and outer surface of the head portion 30 is a smooth arc surface approximately semicircle-shaped. The head portion 30 is provided with a first axial groove 31 opened outwards and located correspondingly to the axial movement direction of the chain 20. The head portion 30 successively from the chain 20 along the first axial groove 31 comprises a first radial groove 32 opened in the radial direction and a first connecting block 33 extended in the radial direction, and the first radial groove 32 and the first connecting block 33 are opposite to one another.

The tail portion 40 is connected to the other end of the chain 20, and the outer surface of the tail portion 40 is also smooth arc surface approximately semicircle-shaped. The tail portion 40 is formed a second axial groove 41 opened outwards and located correspondingly to the axial movement direction of the chain 20. The tail portion 40 successively from the chain 20 along the second axial groove 41 is formed with a second radial groove 42 opened in the radial direction and a second connecting block 43 extended in the radial direction, and the second radial groove 42 and the second connecting block 43 are opposite to one another. The tail portion 40 and the head portion 30 are interconnected in a staggered manner through the first axial groove 31 and the second axial groove 41, the first connecting block 33 of the head portion 30 is engaged in the second radial groove 42, and the second connecting block 43 of the tail portion 40 is engaged in the first radial groove 32 of the head portion 30. Moreover, a shape formed by the interconnection of the head portion 30 and the tail portion 40 is a whole sphere.

The aforementioned is the summary of the positional relationship of the respective relevant components of the first embodiment in accordance with the present invention.

Figure 8:
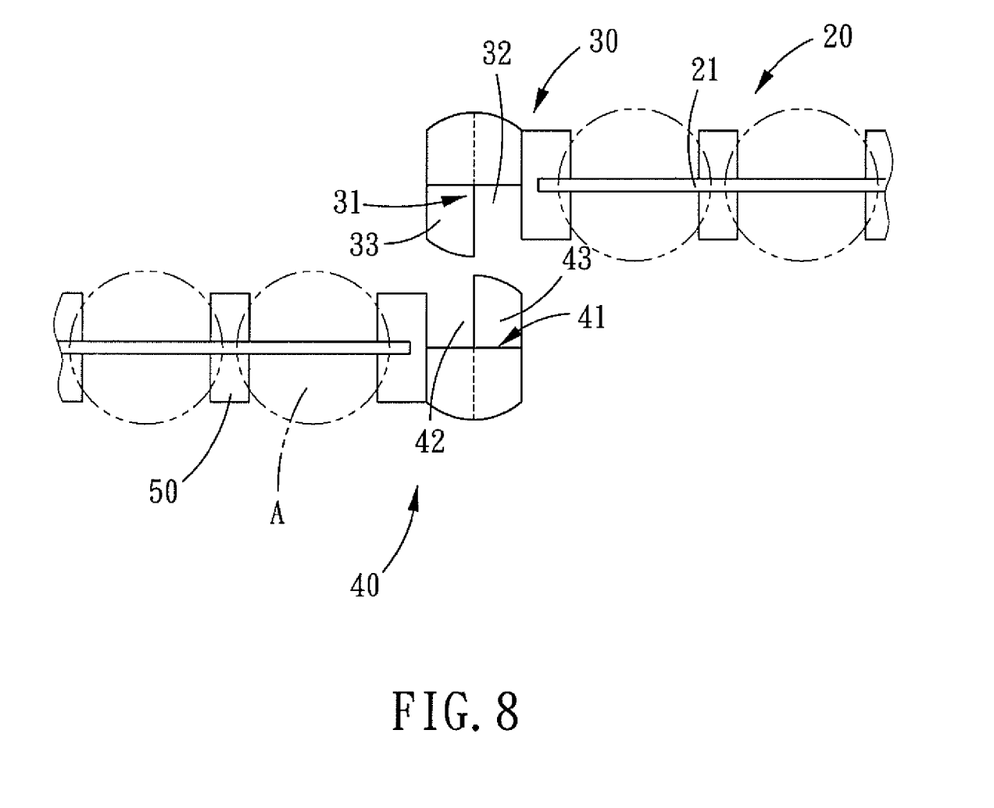
FIG. 8 is a cross sectional view of a disassembled synchronous chain of a second embodiment in accordance with the present invention.
Figure 9:
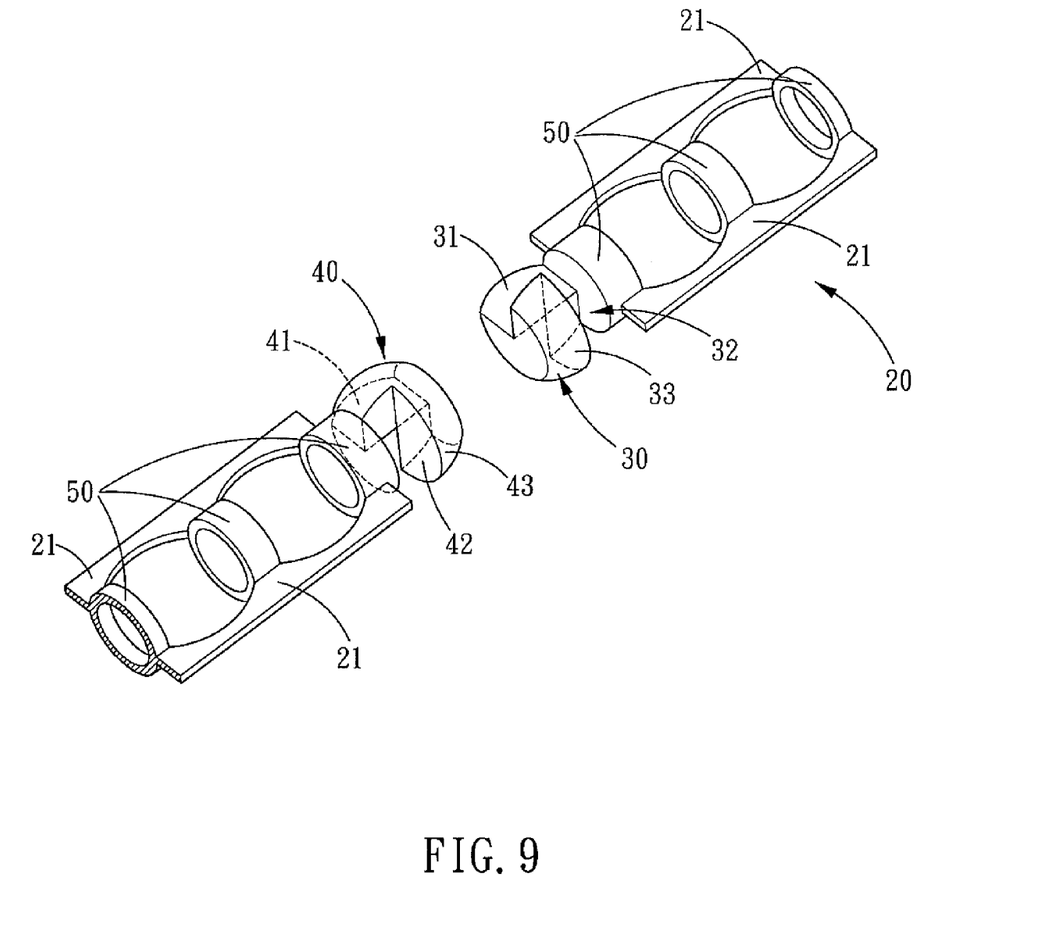
FIG. 9 is an exploded view of the synchronous chain of the second embodiment in accordance with the present invention.

FIGS. 8-9 show a second embodiment of the present invention. A chain 20 of this embodiment has a head portion 30 integrally formed with one end thereof and has a tail portion 40 integrally formed with the other end thereof. A plurality of rolling elements A is retained in the chain 20 by spacers 50 without through holes. Both sides of each spacer 50 are formed with two spherical concaves respectively located correspondingly to the rolling components A. The chain 20 comprises two conjoint elongated protruded link portions 21 which are not extended to the head portion 30 and the tail portion 40. Moreover, the head portion 30 is formed with a first axial groove 31, a first radial groove 32 and a first connecting block 33, and the tail portion is formed with a second axial groove 41, a second radial groove 42 and a second connecting block 43. The structure changes of this embodiment are that:

Neither of the head portion 30 nor the tail portion 40 of the chain 20 is formed with a central through hole (the technology of the aforementioned spacers for retaining rolling elements is conventional, so further explanations will be omitted here), the tail portion 40 and the head portion 30 are interconnected in such a manner the first connecting block 33 and the second connecting block 43 are staggered by the first axial groove 31 and the second axial groove 41, the first connecting block 33 of the head portion 30 is engaged in the second radial groove 42, and the second connecting block 43 of the tail portion 40 is engaged in the first radial groove 32 of the head portion 30, the shape formed by the interconnection of the head portion 30 and the tail portion 40 is the same as a whole guiding sphere, in addition, since there is no a central through hole, the contact area between the tail portion 40 and the head portion 30 is increased, so as to improve the stress resistance and increase the structure stability.

Figure 10:
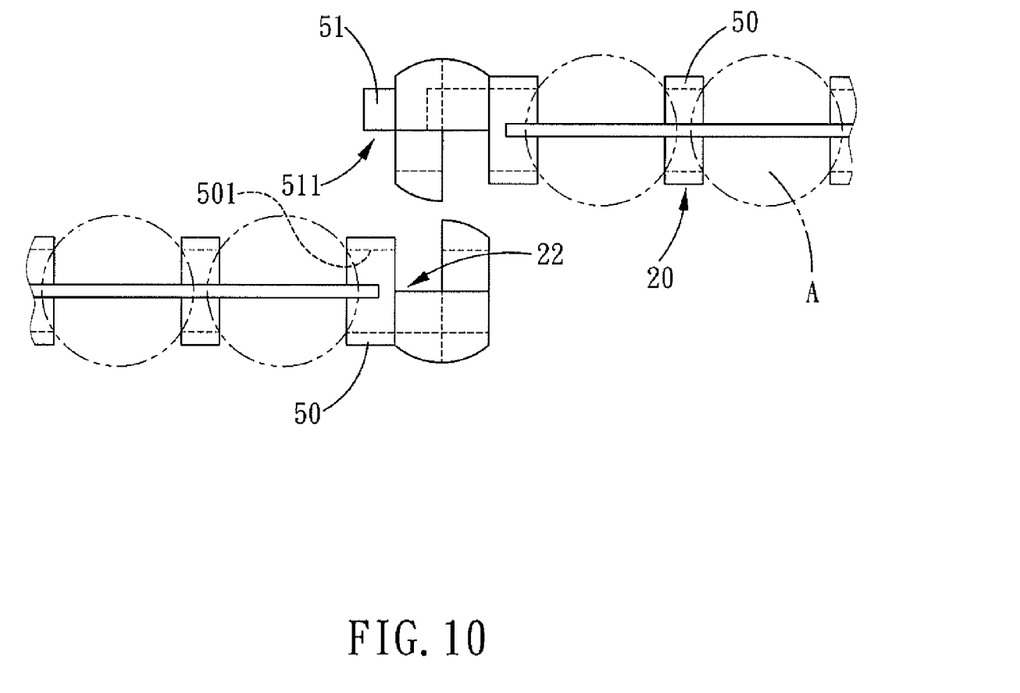
FIG. 10 is a perspective view of a synchronous chain of a third embodiment in accordance with the present invention.

FIG. 10 shows a third embodiment of the present invention. Each spacer 50 of a chain 20 is defined with an annular through hole in the central portion to reserve lubricant. Rolling elements A are disposed between each two adjacent spacers 50, and the spacers 50 are linked together to create a chain by interconnecting the head portion 30 and the tail portion 40. The head portion 30 is formed with a protrusion 51 on the front end thereof. The protrusion 51 is engaged in the central through hole 22 of the spacer 50 adjacent to the tail portion 40, and the outer surface 511 of the protrusion 51 is abutted against the inner surface 501 of the central through hole. In such a manner, the connection between the head portion 30 and the tail portion 40 will be more steady during the movement of the chain 20, and the head portion 30 and the tail portion 40 are still rotatable axially during the circulation, but not likely to be disconnected.

Figure 11:
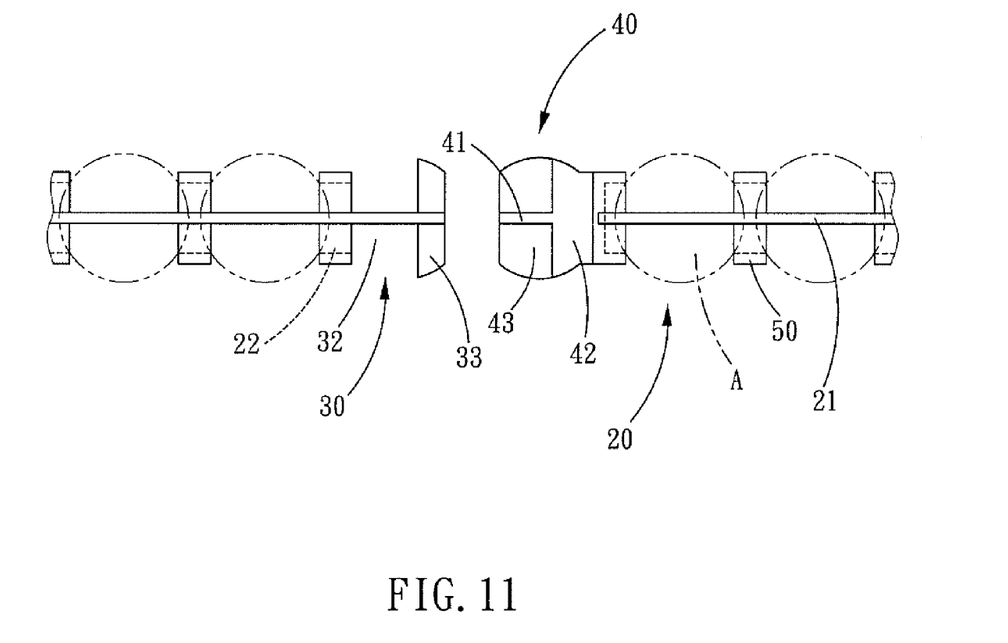
FIG. 11 shows a synchronous chain of a fourth embodiment in accordance with the present invention.
Figure 12:
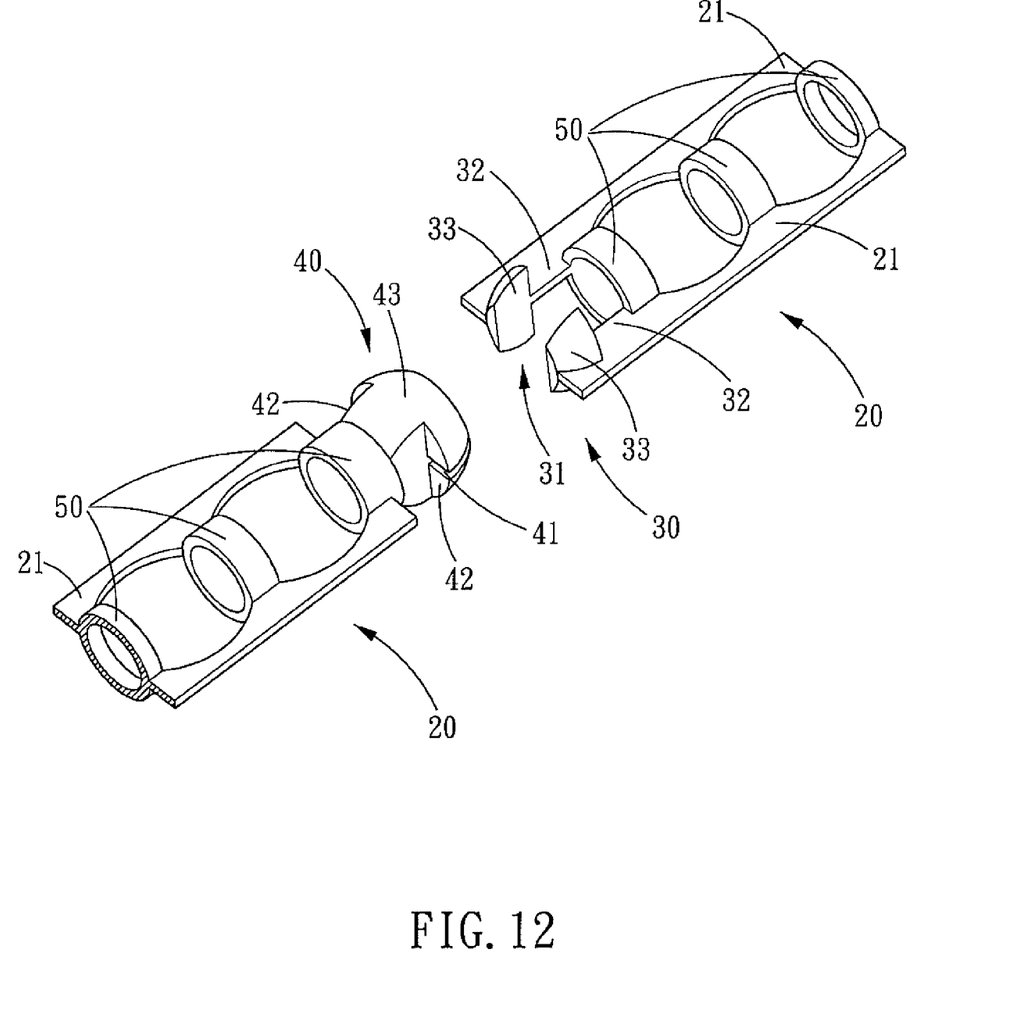
FIG. 12 is an exploded view of the synchronous chain of the fourth embodiment in accordance with the present invention.

FIGS. 11-12 show a fourth embodiment in accordance with the present invention. A chain 20 of the first embodiment has a head portion 30 integrally formed with one end thereof and has a tail portion 40 integrally formed with the other end thereof. From the head portion 30 to the tail portion 40 is formed a central through hole 22 for reserving lubricant. A plurality of rolling elements A is retained in the chain 20 by spacers 50. The chain 20 comprises two conjoint protruded elongated link portions 21, which are not extended to the head portion 30 and the tail portion 40. Moreover, the head portion 30 is formed with a first axial groove 31, two radial grooves 32 and two first connecting blocks 33, and the tail portion is formed with a second axial groove 41, two second radial grooves 42 and two second connecting blocks 43. The structure changes of this embodiment are that:

The second axial groove 41 of the tail portion 40 is defined in the middle portion of the tail portion 40, and the first axial groove 31 of the head portion 30 is defined in the centre of the head portion 30. The tail portion 40 is provided with two groups of the second radial groove 42 and the second connecting block 43. Likewise, the head portion 30 is provided with two groups of the first radial groove 32 and the first connecting block 33. The tail portion 40 and the head portion 30 are interconnected in such a manner the first connecting blocks 33 of the head portion 30 are engaged in the second radial grooves 42, and the second connecting blocks 43 of the tail portion 40 are engaged in the first radial grooves 32 of the head portion 30, thus causing a relatively small moving tolerance, but with the relatively large contact surface, the connecting structure and the fastening structure, the restraint stress is effectively improved and the structure stability is increased. In addition, the shape formed by the interconnection of the head portion 30 and the tail portion 40 is the same as a whole guiding sphere.

Figure 13:
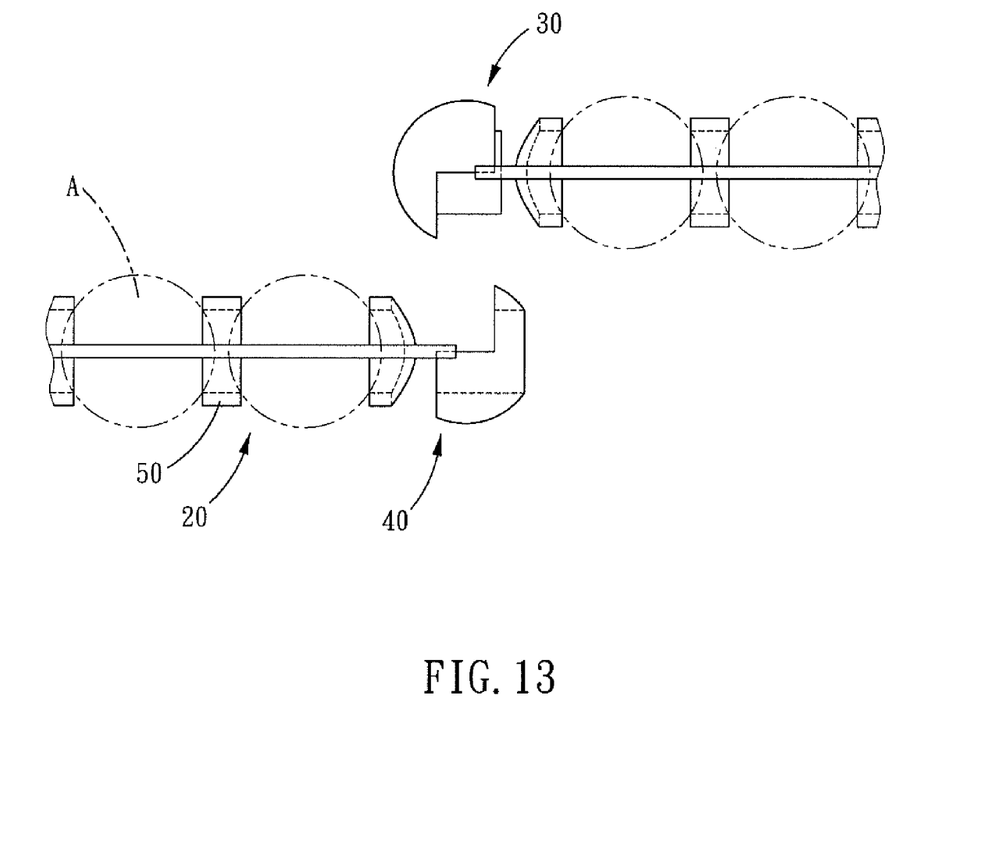
FIG. 13 shows a synchronous chain of a fifth embodiment in accordance with the present invention.
Figure 14:
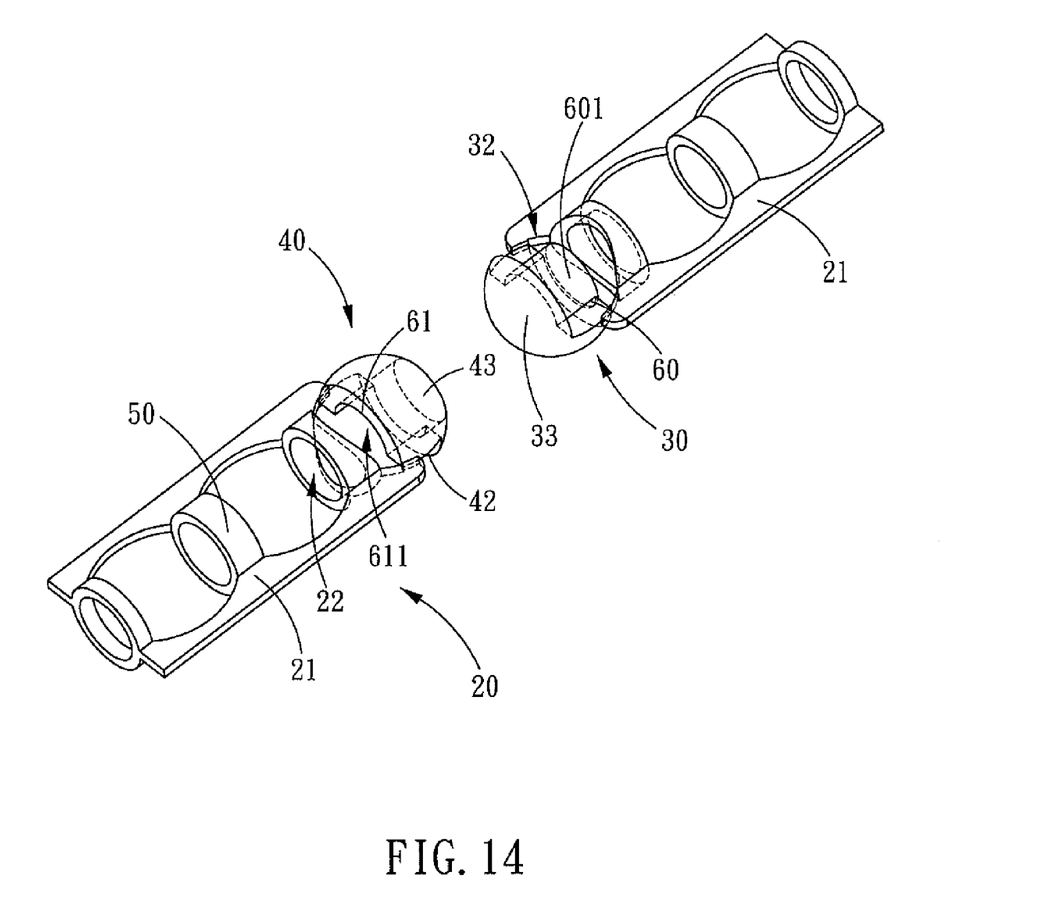
FIG. 14 is an exploded view of the synchronous chain of the fifth embodiment in accordance with the present invention.
Figure 15:
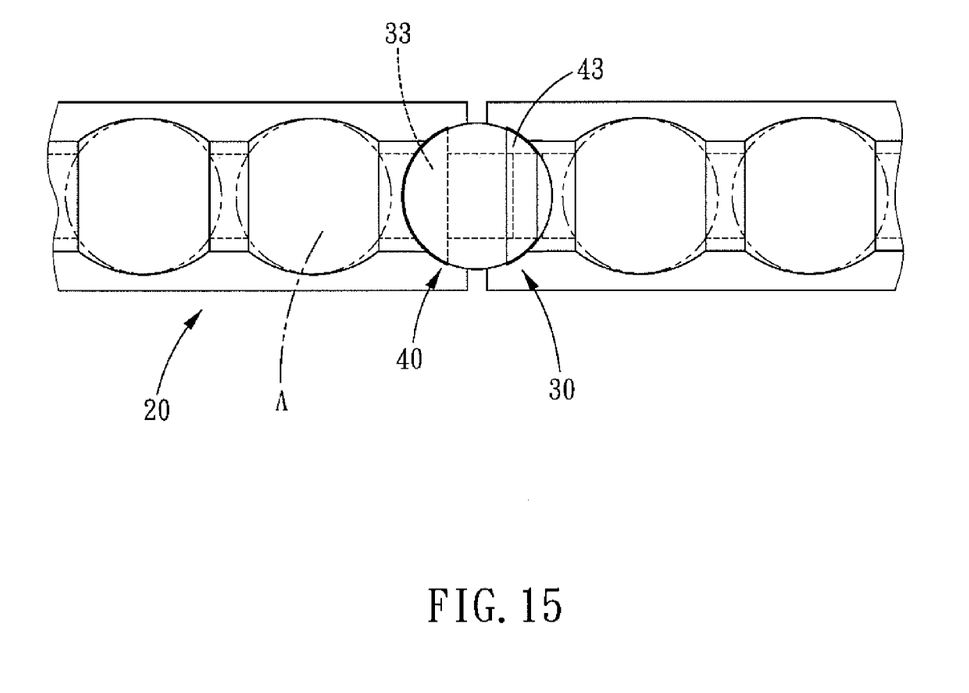
FIG. 15 is a perspective view of the assembled synchronous chain of the fifth embodiment in accordance with the present invention.

FIGS. 13-15 show a fifth embodiment in accordance with the present invention. A chain 20 of the first embodiment has a head portion 30 integrally formed with one end thereof and has a tail portion 40 integrally formed with the other end thereof. A central through hole 22 is formed through the chain 20 and the tail portion 40 for reserving lubricant. A plurality of rolling elements A is retained in the chain 20 by spacers 50. The chain 20 comprises two conjoint elongated protruded link portions 21 which are not extended to the head portion 30 and the tail portion 40. Moreover, the head portion 30 is formed with a first radial groove 32 and a first connecting block 33, and the tail portion is formed with a second radial groove 42 and a second connecting block 43. The structure changes of this embodiment are that:

Neither the head portion 30 nor the tail portion 40 is formed with an axial groove. The first connecting block 33 of the head portion 30 is provided for engaging in the second radial groove 42 of the tail portion 40, and the second connecting block 43 of the tail portion 40 is provided for engaging in the first radial groove 32 of the head portion 30. Moreover, the first radial groove 32 of the head portion 30 is provided with a protuberant portion 60, and a receiving groove 61 is formed in the second connecting block 43 of the tail portion 40. The shape of the protuberant portion 60 is formed correspondingly to the receiving groove 61, and the outer surface 601 of the protuberant portion 60 is abutted against the inner surface 611 of the receiving groove 61, in such a manner, during the circulation, the head portion 30 and the tail portion are not likely to be disconnected, and when passing the return path, the chain 20 still has the flexible performance. In addition, a guiding sphere will be formed by the interconnection of the head portion 30 and the tail portion 40.

To explain the implementation features of the present invention distinctly, the description of the utility modes of the present invention and its improvements relative to the conventional chains are described hereinafter:

1. The head portion and the tail portion of the present invention are interconnected to form a sphere, in such a manner, during the circulation the interference can be avoided, and the sphere formed by the interconnection of the head portion and the tail portion has the guiding effect.

2. A radial moving space predetermined at an interconnecting position where the head portion and the tail portion are interconnected can effectively absorb the size variation by cooperating with the radial degree of freedom.

3. The head portion and the tail portion of the present invention are interconnected. In such a manner, it is convenient for mass production and assembly and has the practicability of immediate production and assembly.

To summarize, a chain of the present invention has a head portion integrally formed with one end thereof and has a tail portion integrally formed with the other end thereof, and the head portion and the tail portion are interconnected in a staggered manner. A moving space is formed in the radial part of the head portion and the tail portion. In addition, a sphere is formed by the interconnection of the head portion and the tail portion. Hence, with the sphere, the interconnected head portion and tail portion, the present invention not only can avoid the interference during the circulation, but also the sphere formed by the interconnection of the head portion and the tail portion has the guiding effect, and can effectively absorb the size variation by cooperating with the radial degree of freedom, furthermore, it is convenient for mass production and assembly.

While we have shown and described various embodiments in accordance with the present invention, it is clear to those skilled in the art that further embodiments may be made without departing from the scope of the present invention.

What is claimed is:

1. A synchronous chain for a liner guideway moved in the liner guideway by cooperating with rolling elements, comprising a head portion integrally formed with one end thereof and a tail portion integrally formed with the other end thereof, and the head portion and the tail portion being interconnected in a staggered manner, and a shape formed by an interconnection of the head portion and the tail portion being a spherical shape corresponding to the shape of the rolling elements;

wherein the head portion is connected with one end of the chain, and the head portion is successively formed from the chain with a first radial groove and a first connecting block extending radially;

the tail portion is connected with the other end of the chain, and the tail portion is successively formed from the chain with a second radial groove and a second connecting block extending radially, the first connecting block of the head portion is engaged in the second radial groove and the second connecting block is engaged in the first radial groove of the head portion.

2. The synchronous chain for a liner guideway as claimed in claim 1, wherein a radial moving space is predetermined at a position where the head portion and the tail portion are interconnected.

3. The synchronous chain for a liner guideway as claimed in claim 2, wherein:

the head portion connected with one end of the chain is formed with a first axial groove opened outwards and located correspondingly to an axial movement direction of the chain, the head portion along the first axial groove from the chain is successively formed with a first radial groove and a first connecting block, and both of the first radial groove and the first connecting block are extended radially and opposite to each other;

the tail portion connected with the other end of chain is formed with a second axial groove opened outwards and located correspondingly to an axial movement direction of the chain; the tail portion along the second axial groove from the chain is successively formed with a second radial groove and a second connecting block, and both of the second radial groove and the second connecting block are extended radially and opposite to each other, moreover, the head portion and the tail portion are interconnected in a staggered manner via the first axial groove and the second axial groove, and the first connecting block of the head portion is engaged in the second radial groove of the tail portion, the second connecting block of the tail portion is engaged in the first radial groove of the head portion.

4. The synchronous chain for a liner guideway as claimed in claim 3, wherein the chain comprises two conjoint elongated protruded link portions, which are used to connect the head portion to the chain.

5. The synchronous chain for a liner guideway as claimed in claim 4, wherein the chain comprises two conjoint elongated protruded link portions, which are used to connect the tail portion to the chain.

6. The synchronous chain for a liner guideway as claimed in claim 1, wherein the chain comprises two conjoint elongated protruded link portions, which are extended to the head portion.

7. The synchronous chain for a liner guideway as claimed in claim 1, wherein the chain comprises two conjoint elongated protruded link portions, which are extended to the tail portion.

8. The synchronous chain for a liner guideway as claimed in claim 1, wherein the chain includes two conjoint elongated protruded link portions, which are used to connect the head portion to the chain.

9. The synchronous chain for a liner guideway as claimed in claim 8, wherein the chain comprises two conjoint elongated protruded link portions, which are used to connect the tail portion to the chain.

* * * * *